United States Patent [19]

Kamata

[11] Patent Number: 5,905,916
[45] Date of Patent: May 18, 1999

[54] LENS-FITTED FILM UNIT WITH A RAPID FILM WINDING SYSTEM

[75] Inventor: Kazuo Kamata, Kanagawa, Japan

[73] Assignee: Fuji Photo Film Co., Ltd., Kanagawa, Japan

[21] Appl. No.: 09/017,150

[22] Filed: Feb. 2, 1998

[30] Foreign Application Priority Data

Feb. 4, 1997 [JP] Japan .................................... 9-021428

[51] Int. Cl.⁶ .................................................. G03B 17/24
[52] U.S. Cl. .................................................. 396/6; 396/411
[58] Field of Search .................................. 396/411, 413, 396/6

[56] References Cited

U.S. PATENT DOCUMENTS 2,180,028  11/1939  Wittel ...................................... 396/411

*Primary Examiner*—David M. Gray
*Attorney, Agent, or Firm*—Young & Thompson

[57] ABSTRACT

A lens-fitted film unit has a film winding mechanism comprising a planetary gear set disposed between a winding knob and a rotary shaft engageable with a spool of a pre-loaded film cartridge to which a film strip at one end is attached. The planetary gear set comprises a sun gear as an integral part of the rotary shaft, a ring gear having a greater number of teeth than that of the sun gear, and at least one planet gear in mesh with the sun gear and the ring gear which revolves around the sun gear by means of rotation of the winding knob and rotates on its own axis so as to increase rotation of the winding knob and transmits the increased rotation to the rotary shaft, and hence the spool, so as thereby to decrease a burden on the user.

10 Claims, 6 Drawing Sheets

LENS-FITTED FILM UNIT WITH A RAPID FILM WINDING SYSTEM

BACKGROUND OF THE INVENTION

1. Field of the Invention

The invention relates to what is called a lens-fitted film unit which is a single-use camera with a pre-loaded film, and, more particularly, to a lens-fitted film unit equipped with a film winding mechanism for rapid film winding.

2. Description of Related Art

A lend-fitted film unit with a film pre-loaded and a simple exposure mechanism incorporated therein, which is well known as a single-use or disposable camera, has been manufactured and marketed by the assignee of the present application. There are a variety of lens-fitted film units with a plastic film container such as a patrone or cartridge.

Such a lens-fitted film unit typically comprises a cartridge receiving chamber in which a film cartridge is pre-loaded and a film receiving chamber into which substantially the entire length of an unexposed filmstrip factory pre-wound out of the cartridge is received in a roll, these chambers being located at opposite ends of an exposure mechanism including a taking lens. One of the structural features of the lens-fitted film unit is a curved film passage between the film cartridge receiving chamber and the film receiving chamber to place the film in a concave focal plane. Film winding is performed for every exposure by rotating a winding knob engaged with a spool of the cartridge atop the film cartridge receiving chamber to wind exposed frames into the film cartridge frame by frame.

One of the film cartridges contains a roll of film having at most 40 frames for exposure. This 40 exposures film cartridge is equipped with a spool whose outer diameter is 7 mm. When a fresh lens-fitted film unit is used, the winding knob is rotated to advance and place the first frame into the exposure aperture and, by means of the film advancement, to charge a shutter drive mechanism and resetting a film counter. After exposure of the last frame, the winding knob is rotated until the entire length of the film strip is completely wound into the cartridge so that the film cartridge can be taken out of lens-fitted film unit in the light.

At the leading and trailing portions at opposite ends of the exposable portion, the film strip has several frames unusable for exposure but used for other purposes, for example, film processing. In the case where the lens-fitted film unit with a film cartridge pre-loaded therein, the winding knob is necessarily operated by approximately 1.25 turns, i.e. 450 degrees, in order to set the first frame in position and approximately 3.8 turns, i.e. 1,360 degrees, in order to completely wind up the entire length of film strip into the cartridge after exposure of the last frame.

When the winding mechanism is designed and adapted to permit the winding knob to be rotated 113 degrees by a single operation, it is necessary to turn the winding knob 4 times of operation before setting the first frame in the exposure aperture and 12 times operation until winding up the film strip completely into the cartridge after exposure of the last frame, which is troublesome and always imposes a burden on the user. In some types of the conventional cameras which are designed and adapted to allow the user to load a film roll easily, a step-up gear train is incorporated between a winding knob or winding lever and a spool of a film cartridge to transmit an increased speed of rotation from the winding knob to the spool. This kind of step-up gear train is, however, generally too bulky to be applied to the lens-fitted film unit one of whose features is to be small in size and compact in structure.

SUMMARY OF THE INVENTION

An object of the invention is to provide an improved lens-fitted film unit which is able to reduce a burden or trouble of film winding operation before exposure of the first frame of the film and after exposure of the last frame.

Another object of the invention is to provide a simple and compact gear system suitable for rotating a spool of a film cartridge loaded in a camera.

According to an aspect of the invention, a film winding mechanism for winding a photographic film strip into a film container such as an empty film cartridge factory pre-loaded in a photographic apparatus after exposure comprises a spool mounted for rotation inside the film container to which a film strip at one end is attached, a spool driving shaft engaged with one end of the spool, a driving member such as a wheel knob manually operated to cause rotation of the spool driving shaft to wind the film strip onto the spool, and a planetary gear set interposed as a step-up gear between and connected to the driving member and the spool driving shaft. The planetary gear set, which comprises a sun gear as an integral part of the rotary shaft, a ring gear having a greater number of teeth than that of the sun gear, and at least one planet gear in mesh with the sun gear and the ring gear which revolves around the sun gear by means of rotation of the winding knob and rotates on its own axis, increases rotation of the winding knob and transmits the increased rotation to the rotary shaft.

According to another aspect of the invention, the film winding mechanism is incorporated to a lens-fitted film unit which contains therein a film strip, a factory pre-loaded empty film cartridge. The film winding mechanism winds the film strip into the film cartridge after exposure.

The film winding mechanism may employ a planetary gear set of the type having three planet gear placed in same circle around the driven gear at regular angular intervals.

With the film winding mechanism of the invention, rotation of the winding member, such as a rotary type of winding knob, is increased by means of the planetary gear set with an effect of reducing a burden of operation necessary to wind up the film strip on the user. Furthermore, the planetary gear set is interposed between the film winding member and the rotary shaft for rotating the cartridge spool, which saves space in a lens-fitted film unit and realizes the compactness of the lens-fitted film unit.

BRIEF DESCRIPTION OF THE DRAWINGS

The above and other objects and features of the invention will be clearly understood from the following description of an embodiment thereof when considered in conjunction with the accompanying drawings, in which.

DETAILED DESCRIPTION OF THE INVENTION

Figure 2:
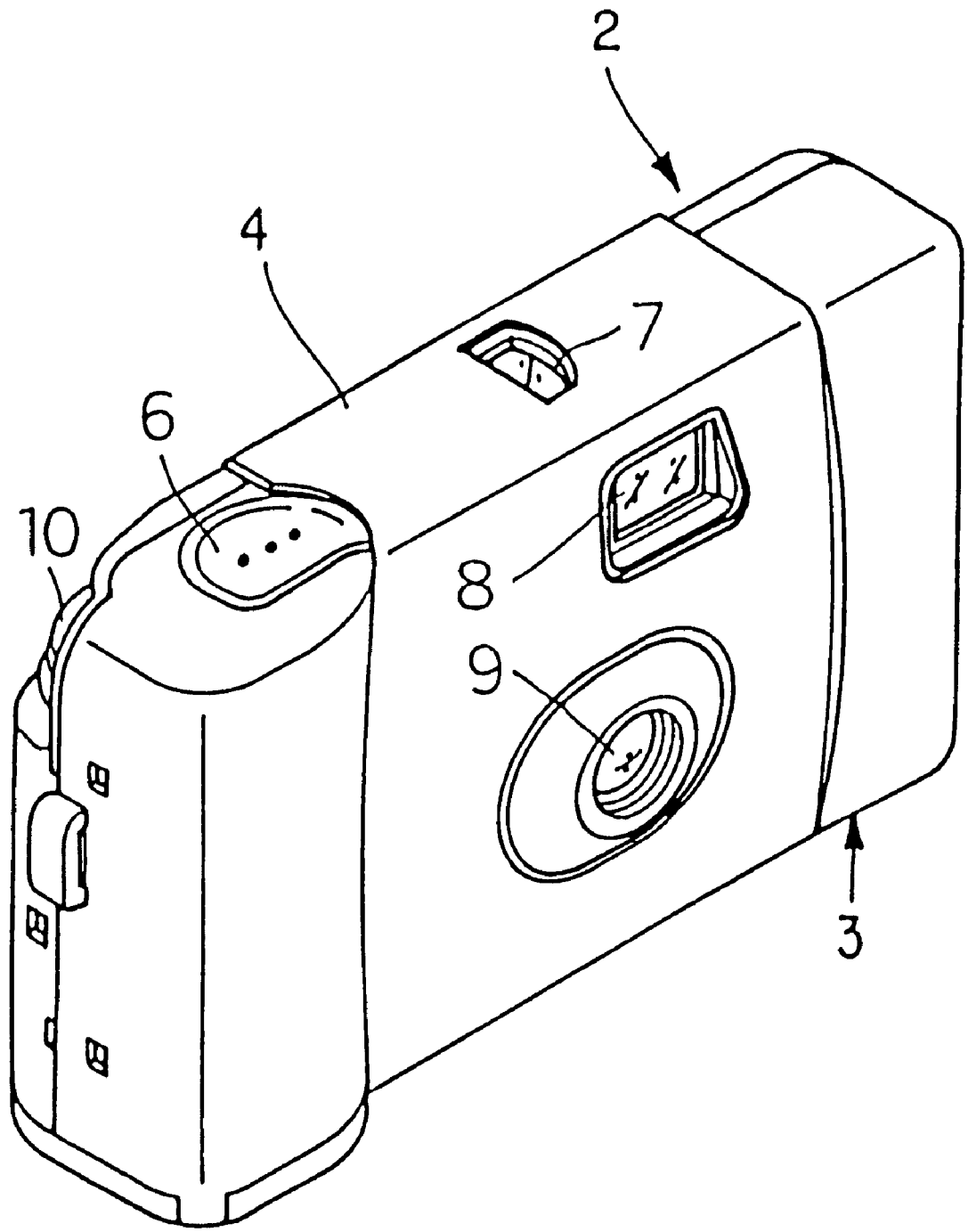
FIG. 2 is a perspective view of a lens-fitted film unit in accordance with an embodiment of the invention.

Referring to the drawings in detail and, in particular, to FIG. 2, a lens-fitted film unit 2 in accordance with an embodiment of the invention comprises a main unit 3 in which a photographic film strip is factory pre-loaded and various mechanisms necessary for taking pictures are built in and a paper wrapper 4 partly covering the main unit 3. The main unit 3 at its top has a shutter release button 6 and a counter window 7 at its top wall and a view finder window 8 of a finder system (not shown) and a taking lens system 9 at the front wall. A winding knob 10 is incorporated to the back of the main unit 3 so as to be partly inside the main unit 3 and partly out of the main unit 3. The paper wrapper 4, which has front openings to expose the taking lens system 9 and the view finder window 8, respectively and a top opening to expose the counter window 7, is of a sticker type of close band and covers around the central part of the main unit 3.

Figure 3:
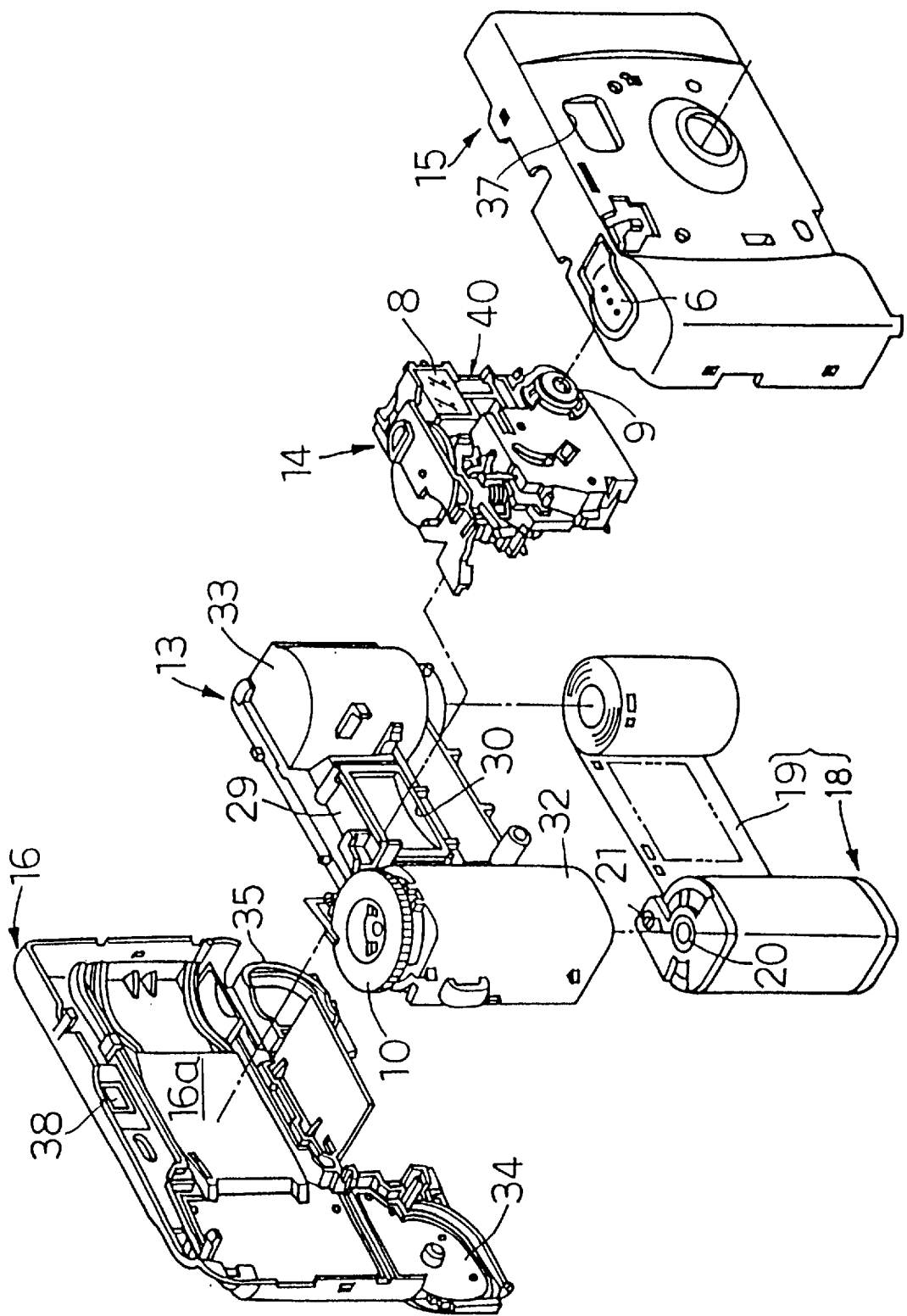
FIG. 3 is an exploded perspective view of the lens-fitted film unit shown in FIG. 2.

As shown in FIG. 3, the main unit 3 comprises a front cover section 15 and a back cover section 16 between which a main body section 13 is interposed. An exposure mechanism unit 14 is fixed to the main body section 13 by means of hooks.

A film cartridge 12 comprises a generally cylindrically-shaped, light-tight plastic container 18 and a photographic film strip 19 with one of its ends fixed to a cartridge spool 20 in the light-tight plastic container 18. The light-tight container 18 is molded out of light-opaque plastic material and holds the spool 20 therein for rotation. A films unwinding mechanism, such as disclosed in Japanese Unexamined Patent Publication No. 6-266053, is installed in the light-tight plastic container 18. The spool 20 at opposite ends has coaxial flanged disks between which the films trip is supported in the form of roll. The light-tight plastic container 18 comprises a snout-like film gate 22 forming a film egress/ingress slot through which the film strip 19 is withdrawn and pulled into. The light-tight plastic container 18 incorporates therein a rod-like light lock door 21 which is turned in opposite directions from the outside thereof to open and close the film egress/ingress slot.

Figure 4:
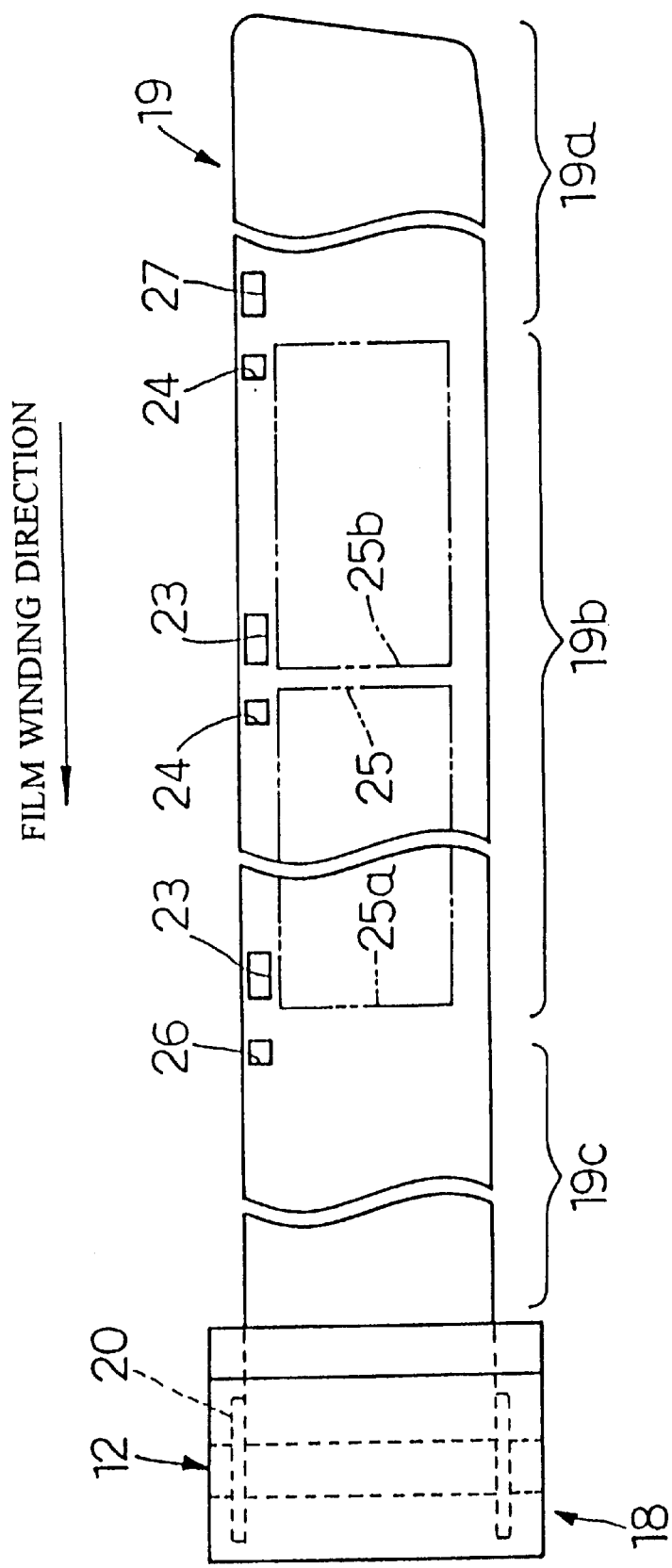
FIG. 4 is an explanatory diagram of a film strip unwound out of a film cartridge.

As shown in FIG. 4, a film strip 19 has a free end portion or leading end portion 19a, an exposure portion 19b in which latent images are formed and a trailing portion 19c the end of which is detachably engaged with the spool 20 of the container 18. The film strip 19 has a row of large and small perforations 23 and 24, one pair for each image frame 25, at alternate short and long regular distances in one of its side margins. As viewed in a winding direction in which the film strip 19 is pulled in the film container 18, the large perforation 23 defines a front end of the image frame 25 and the small one 26 defines a rear end of the image frame 25. An image frame 25a shown in FIG. 4 is the foremost one and an image frame 25b is the last frame. In the lens-fitted film unit, the film strip 19 is not moved out of the cartridge but moved only into the film container 18 because, as previously described, the film strip 19 has already been withdrawn out of the film container 18 and pre-wound onto a spool in the film receiving chamber or otherwise simply into a roll in the same.

The film strip 19 is re-wound onto the spool 20 of the film container by rotating the winding knob 10. Both leading portion and trailing portion of the film strip 19 can not be available for exposure but be used for other purposes of, for example, processing. Each portion is long enough to have length equivalent to the total length of several image frames. The leading and trailing portions 19a and 19c are re-wound into the film container 18 without being exposed. The illustrated film strip 19 used for the lens-fitted film unit is different from that used in an ordinary APS cameras with respect to sizes and locations of perforations formed in the film strip. In a film strip used in the ordinary APS camera, all of the perforations are the same in size as the small one in the film strip 19 and there is no perforation in its trailing portion 19c, such as an extra perforation 26 in the film strip 19 which is used to rotate a sprocket to charge a shutter for first exposure. An extra perforation 27, which the ordinary APS film strip and the film strip 19 have in their leading portions, is used to charge a shutter of the ordinary camera during initially setting the film in position in the camera.

The main body section 13 has a dark chamber 29, positioned between the film roll receiving chamber 33 and the film cartridge receiving chamber 32, which forms a light passage between an exposure aperture (which is hidden in the figure) at the back thereof and a front aperture 30 as a light entrance at the front thereof. The front aperture 30 restricts incident light to pass through to the film strip, and the exposure aperture forms a slightly curved film guide surface and defines an exposure area, i.e. an image frame, on the film strip 19.

The dark chamber 29, the film roll receiving chamber 33 and the film cartridge receiving chamber 32 which constitute the main body section 13 are prepared as an integral part. Open bottoms of the film roll receiving chamber 33 and the film cartridge receiving chamber 32 are closed by flap-type bottom lids 35 and 34, respectively, which are formed as integral parts of the rear cover section 16, when the rear cover section 16 is secured to the main body section 13. The flap-type lids 34 and 35 have a thin connecting portion functioning as hinges. The bottom lid 34 for the film cartridge receiving chamber 32 is opened when the film cartridge 12 is taken out of the lens-fitted film unit 3.

The front cover section 15, which is detachably secured to the front side of the main body section 13, has a resilient shutter actuating button 6 formed as an integral part of the top wall of the front cover section 13 and openings 37 and 39 for the view finder 8 and the taking lens system 9, respectively. The rear cover section 16, which is secured to the back side of the main body section 13 with hooks, forms a slightly curved film supporting surface 16a mating with and facing the slightly curved film guide surface of the exposure aperture of the dark chamber of the main body section 13 and has an opening 38 for the view finder system 8 above the film supporting surface 16a.

Figure 1:
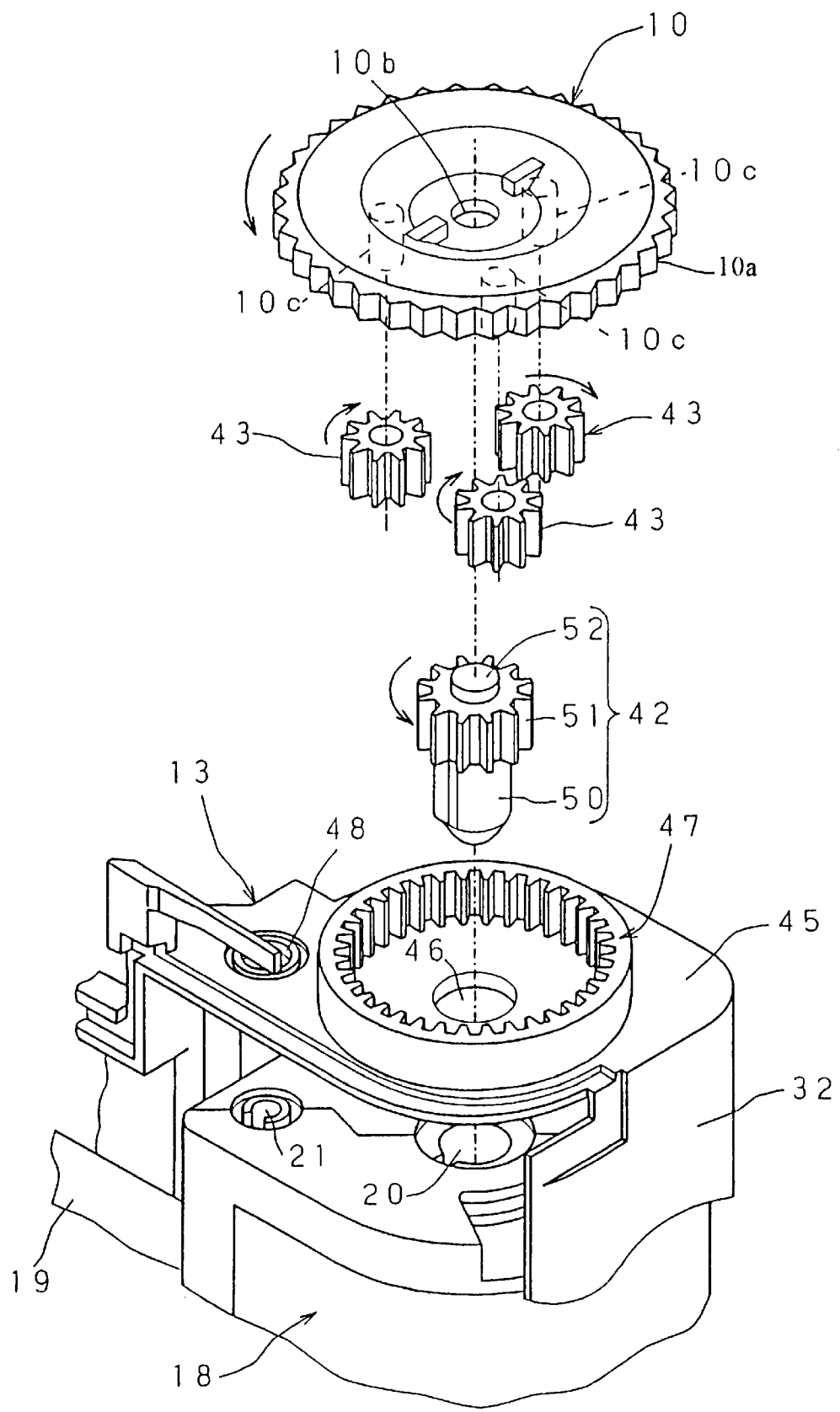
FIG. 1 is an exploded perspective view of a film winding mechanism in accordance with an embodiment of the invention.
Figure 5:
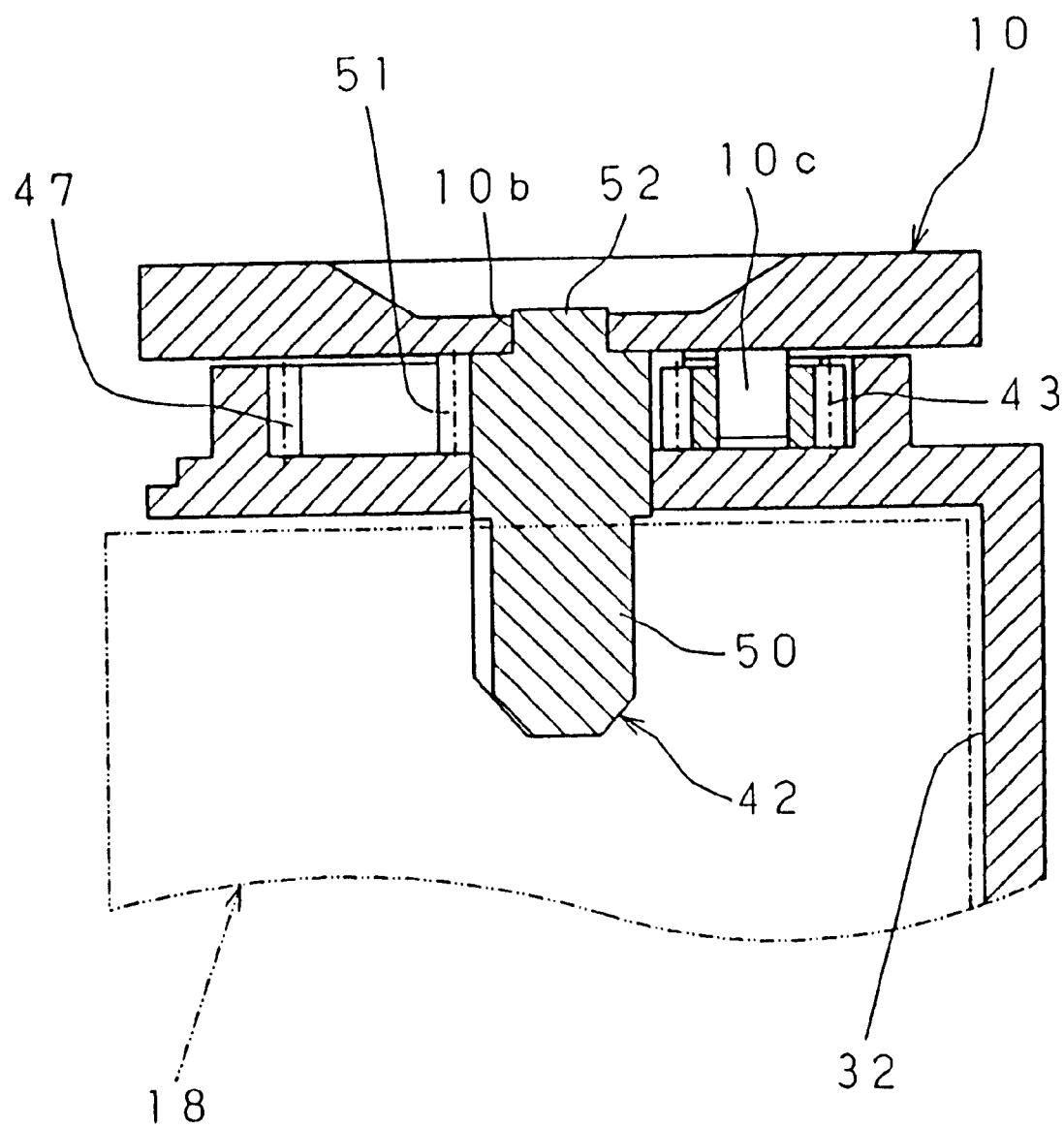
FIG. 5 is a cross-sectional view of a film winding mechanism.
Figure 6:
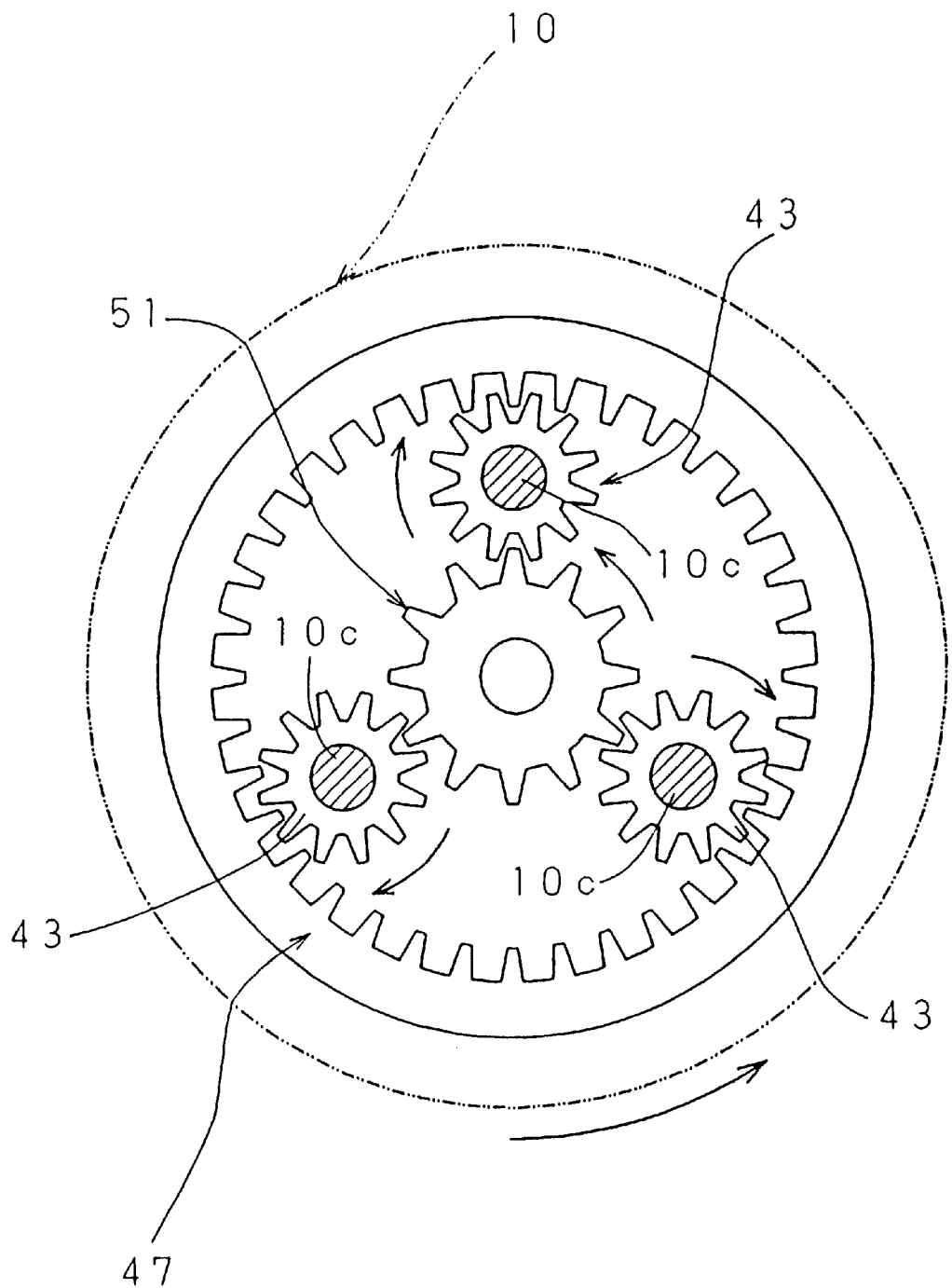
FIG. 6 is a plan view of a planetary gear set incorporated in the film winding mechanism shown in FIG. 5.

The exposure unit 14 mounted on the front side of the dark chamber 29 of the main body section 13 with hooks has at least an exposure control means, such as a shutter charging and releasing mechanism, an automatic film wind-stop mechanism and a film counter mechanism in addition to the taking lens system 9 and the view finder system 8. These components of the exposure unit 14 are mounted on a base block 40 by means of a number of bosses and projections molded integrally with the base block. The exposure unit 14 is detachably secured to the main body section 13 by means of engaging hooks As shown in FIGS. 1, 5 and 6, the main body section 13 at the top of the film cartridge receiving chamber 32 has the winding knob 10 and a planetary gear set therein. The winding knob 10, which is shaped in the form of a disk with ridges 10a on its outer periphery, has a center bore 10b in which a spool driving rotary shaft 42 is partly received. Three pinion carrier shafts 10c extend downward from a bottom surface of the winding knob 10 on which three planet gears 43 are mounted, respectively, for rotation. The film cartridge receiving chamber 32 at its top wall 45 has a ring gear 47 with internal teeth and a hole 46 at the center of the ring gear 47. The center hole 46 which receives a journal portion of the spool driving rotary shaft 42. The spool driving rotary shaft 42 at its distal end is engageable with the top end of the spool 20. Also in the top wall 45 of the film cartridge receiving chamber 32, a journal bearing 48 for supporting a light lock door driving shaft (not shown) engaged with one of ends of the rod-like light lock door 21. The light lock door driving shaft forms a part of a light lock door closing mechanism together with a connecting rod (not shown) mounted between the dark chamber 29 and the film cartridge receiving chamber 32. The connecting rod is connected at one of its ends to the flap-type bottom lid 34 of the back cover section 16 and at another end to the light lock door driving shaft. The connecting rod is spring-loaded so as to hold in an open position in which it keeps the light lock door 21 remaining open. When the flap-type bottom lid 34 is opened after the film strip 19 has been completely exposed and completely put into the film container 18, the light lock door 21 is automatically closed by means of movement of the connecting rod caused by opening movement of the bottom lid 34 with an effect of bringing the light lock driving member into departure from the open position, which causes the spring loaded light lock door driving shaft to self-turn back to close the light lock door 21.

The spool driving rotary shaft 42 comprises a stem portion 50 engageable with the cartridge spool 20, a top boss portion 52 and a gear portion 51 with external teeth which is formed as a sun gear between the stem portion 50 and the top boss portion 52 and functions as a sun gear or driven gear. Those three portions are formed integrally in this instance or otherwise made separately and assembled as one whole. The number of external teeth of the driven gear 51 is smaller than that of the ring gear 47. The three planet gears 43 mounted on the three carrier shafts 10c extending downward from the winding knob 10, respectively, for rotation, are placed between and in mesh with the driven or sun gear 51 and the ring gear 47. The winding knob 10 rotates about the top boss 52 inserted into the hole 10b of the winding knob 10. The planetary gear set thus structured is built in a small space in the tight interior of the lens-fitted film unit 3 under the winding knob 10 without being accompanied by an increase in overall size of the lens-fitted film unit or with an effect of keeping compactness, one of main features of the lens-fitted film unit. Counterclockwise rotation (as seen in FIG. 1) of the winding knob 10 in a direction in which the film strip 19 is re-wound into the film container 18 causes the three planet gears to revolve counterclockwise around the sun gear 51 while being rotated clockwise on their own axes by the ring gear 47. The clockwise rotation of the planet gears 43 causes counterclockwise rotation of the sun gear 51, and hence to the spool driving rotary shaft 42, which is in the same direction of rotation as the winding knob 10. The spool driving rotary shaft 42 is increased in the speed of rotation at a gear ratio between the ring gear 47 and the sun gear 51 and rotates faster than the winding knob 10. Specifically, in this planetary gear set, the rotational speed ratio of the sun gear 51 to the winding knob 10 which carries the planet gears 43 is defined as (Z1+Z2)/Z2, where Z1 and Z2 represent the number of teeth of the ring gear 47 and the sun gear 43 of the spool driving rotary shaft 42, respectively.

In operation of the lens-fitted film unit 2 in accordance with an embodiment of the invention, the user of the lens-fitted film unit 2 shown in FIG. 2 turns the winding knob 10 in a film winding direction following directions for use indicated on an envelope of the lens-fitted film unit 2 or on the paper wrapper 4 until the first exposure frame 25a of the film strip 19 is placed in exposure position and shutter charge is completed.

Counterclockwise rotation (as viewed in FIG. 1) of the winding knob 10 causes rotation of the planet gears 43 to revolve around the sun gear 51 while rotating clockwise on their own axes, causing rotation of the sun gear 51. In this way, the counterclockwise rotation of the winding knob 10 is stepped up and transmitted to the sun gear 51, and hence the spool driving rotary shaft 42, through the planetary gear set. The cartridge spool 20 in engagement with the step portion 50 of the spool driving rotary shaft 42 rotates counterclockwise to wound the film strip thereon. With the lens-fitted film unit 2, the film strip 19 is wound more quickly as compared with the conventional lens-fitted film unit in which a winding knob is directly connected to a cartridge spool and a smaller number of rotation is needed for the winding knob 10 to wind the film strip 19 for a preparation for exposure of the first frame. After the preparation, the lens-fitted film unit 2 is ready for exposure of the film strip 19. Following framing through the view finder system 8, the shutter is released to expose of the first frame 25a.

The winding knob 10 is turned every exposure to wind up the film strip 19 into the film container 18 and to charge the shutter. Film winding by one frame is quickly completed as compared with the conventional lens-fitted film unit, which is desirable to make the lens-fitted film unit 2 ready for another exposure, and avoids missing photo opportunities. When the film strip 19 is completely exposed, the winding knob 10 is further turned following to the directions to rewind the film strip 19 completely into the film container 18. At this time, smaller number of rotations of the winding knob 10 is needed to wind up the film strip 19 completely into the film container 18., which decreases a burden on the user.

The planetary gear set incorporated in the lens-fitted film unit 2 described above has, for example, a ring gear 47 with 37 teeth (Z1), a sun gear 51 with 12 teeth (Z2) and a planet gear 43 with 12 teeth (Z3). In this example, the speed step-up ratio of the spool driving rotary shaft 42 to the winding knob 10 is defined by (Z1+Z2)/Z2 and amounts to approximately 4. This means that the winding knob 10 need be operated only once by which the first frame is placed in exposure position and only three times to re-wind the leading portion 19a of the film strip 19 completely into the film container 18 after exposure of the last frame 25b, which are greatly reduced in operation time of the winding knob 10 as compared with the winding knob of the conventional lens-fitted film unit which needs four operations and twelve operations, respectively. Any numbers of teeth Z1, Z2 and Z3 may be chosen for the gears of the planetary gear set to provides other desired speed ratios or to meet some designing requirements as long as those numbers meet the following equation:

$$Z1 = Z2 + Z3 \times 2 + K$$

where K is an integer less than four (4) and preferably one (1). If K is greater than three (3), the equation is not satisfied as it is, and if K is zero (0), it is impossible to provide clearance between gears, which needs negative addendum modifications.

Though, in the embodiment as set forth, the lens-fitted film unit 2 using an APS film cartridge has been shown and explained, the invention is not limited to that and may be also applied to cameras including lens-fitted film units for use with a 35 mm roll film, and ordinary camera equipped with a manually winding apparatus or even with a motor-driven winding one. Also one or two, or more than three, planet gears are applicable to the planetary gear set of the invention. Furthermore, whereas the rotational direction of the winding knob may be the same as that of the spool driving rotary shaft in the embodiment, however, if necessary, the rotational directions of the winding knob and the spool driving rotary shaft may be opposite to each other, for instance, by mounting the planet gear on a part of the main unit body and securing the ring gear to the winding knob.

According to the invention described above, the user is required to perform fewer operations of the winding knob to wind up the film in the film container as compared with the prior art cameras. In other wards, a camera with the winding mechanism of this invention can wind up the film much faster than the prior art camera, so the user can without rarely missing the moment for a good picture. In addition to that, as the planetary gear set is built compactly in a small restricted space under the winding knob, rapid film winding capability of the lens-fitted film unit is obtained without losing compactness which is one of the main features of the lens-fitted film unit.

What is claimed is:

1. A film winding mechanism for winding a photographic film strip in a photographic apparatus after exposure, the film winding mechanism comprising:
    a spool mounted for rotation inside the photographic apparatus to which one end of a film strip is attached;
    a spool driving shaft engaged with one end of the spool;
    a driving member operable to cause rotation of the spool driving shaft to wind the film strip onto the spool; and
    a planetary gear set interposed between and connected to the driving member and the spool driving shaft, the planetary gear set comprising:
        an immovable ring gear having inward facing teeth, the ring gear being fixed to an exterior of a main body of the photographic apparatus;
        a driven sun gear rotatable disposed within the ring gear and attached to the spool driving shaft; and
    at least one planet gear, each being meshed with both the ring gear and the sun gear, a rotational axis of each said planet gear being fixed with respect to the driving member;
    wherein the driving member, the planetary gear set, and the spool driving shaft are arranged so that rotation of the driving member through a given angular displacement causes rotation of the spool driving shaft through an angular displacement greater than that of the driving member.

2. The film winding mechanism as recited in claim 1, wherein the driving member comprises a manually operable rotary knob disposed entirely outside of the main body of the photographic apparatus.

3. The film winding mechanism of claim 2, further comprising a top boss disposed on an end of the sun gear opposite the spool driving shaft, the top boss being rotatably supported within an aperture disposed in a center of the rotary knob.

4. The film winding mechanism as recited in claim 2, wherein the planet gears are disposed at regular angular intervals, each of the planet gears being rotatable mounted on a carrier shaft disposed on a lower face of the rotary knob.

5. The film winding mechanism of claim 4, further comprising a top boss disposed on an end of the sun gear opposite the spool driving shaft, the top boss being rotatably supported within an aperture disposed in a center of the rotary knob.

6. A lens-fitted film unit containing therein a film strip, a factory pre-loaded empty film cartridge, and a film winding mechanism for winding the film strip into the film cartridge after exposure, the film winding mechanism comprising:
    a spool mounted for rotation inside the film cartridge to which one end of a filmstrip is attached;
    a spool driving shaft engaged with one end of the spool;
    a driving member operable to cause rotation of the spool driving shaft to wind the film strip onto the spool; and
    a planetary gear set interposed between and connected to the driving member and the spool driving shaft, the planetary gear set comprising:
        an immovable ring gear having inward facing teeth, the ring gear being fixed to an exterior of a main body of the photographic apparatus;
        a driven sun gear rotatable disposed within the ring gear and attached to the spool driving shaft; and
    at least one planet gear, each being meshed with both the ring gear and the sun gear, a rotational axis of each said planet gear being fixed with respect to the driving member;
    wherein the driving member, the planetary gear set, and the spool driving shaft are arranged so that rotation of the driving member through a given angular displacement causes rotation of the spool driving shaft through an angular displacement greater than that of the driving member.

7. The film winding mechanism as recited in claim 6, wherein the driving member comprises a manually operable rotary knob disposed entirely outside of the main body of the lens-fitted film unit.

8. The film winding mechanism of claim 7, further comprising a top boss disposed on an end of the sun gear opposite the spool driving shaft, the top boss being rotatably supported within an aperture disposed in a center of the rotary knob.

9. The lens-fitted film unit as recited in claim 7, wherein the planet gears are disposed at regular angular intervals, each of the planet gears being rotatable mounted on a carrier shaft disposed on a lower face of the rotary knob.

10. The film winding mechanism of claim 9, further comprising a top boss disposed on an end of the sun gear opposite the spool driving shaft, the top boss being rotatably supported within an aperture disposed in a center of the rotary knob.

* * * * *